Dec. 30, 1930.  J. S. REID  1,786,722

NECK AND CLOSURE STRUCTURE

Filed Feb. 15, 1929

INVENTOR
JAMES S. REID
BY
Brockett, Hyde, Higley & Meyer
ATTORNEYS

Patented Dec. 30, 1930

1,786,722

UNITED STATES PATENT OFFICE

JAMES S. REID, OF CLEVELAND, OHIO, ASSIGNOR TO THE EATON AXLE AND SPRING COMPANY, OF CLEVELAND, OHIO, A CORPORATION OF OHIO

NECK AND CLOSURE STRUCTURE

Application filed February 15, 1929. Serial No. 340,102.

This invention relates to a neck and closure structure of the type having a tubular neck and a removable closure for one end thereof, said neck being provided at its end to be closed with opposed cam portions and said closure being provided with opposed locking portions for co-operative engagement therewith.

The general object of the present invention is the provision of an improved neck and closure structure of this type which is of simple and inexpensive construction and especially efficient in use, the closure of the structure being capable of quick and easy connection to and disconnection from the neck thereof.

Further objects of the invention are in part obvious and in part will appear more in detail hereinafter.

Figure 1:
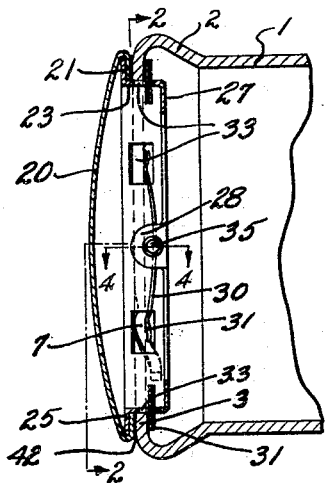
Figure 2:
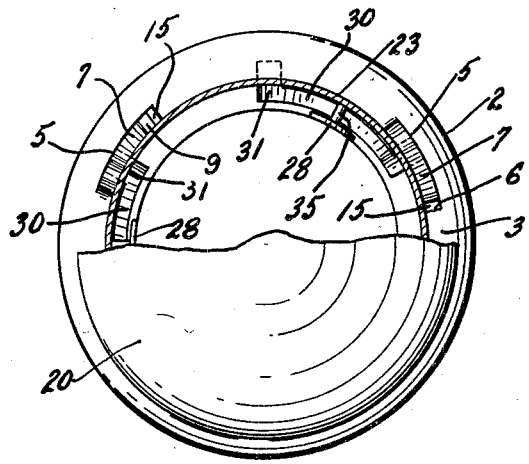
Figure 3:
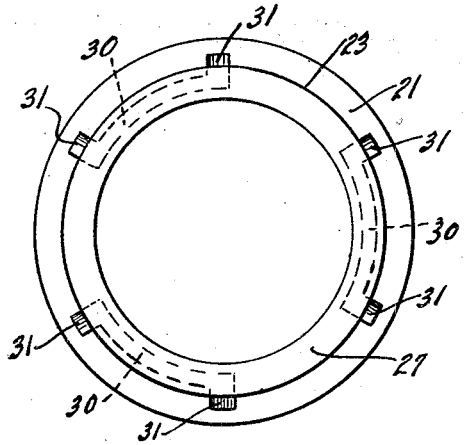
Figure 4:
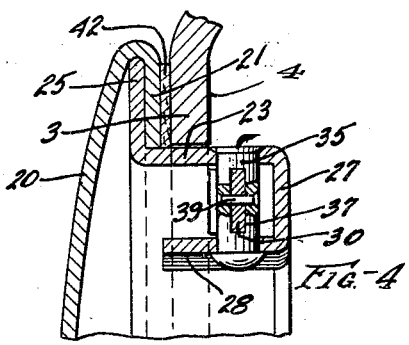
Figure 5:
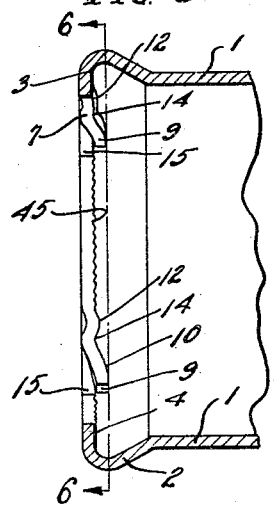

In the accompanying drawing, Fig. 1 is a central longitudinal sectional view of the present improved neck and closure structure; Fig. 2 is a cross sectional view thereof on the line 2—2, Fig. 1; Fig. 3 is a bottom plan view of the closure of the structure; Fig. 4 is an enlarged detail sectional view of said closure on the line 4—4, Fig. 1; Fig. 5 is a central longitudinal sectional view of the neck of the structure; and Fig. 6 is a cross sectional view of said neck on the line 6—6, Fig. 5.

The tubular neck of the structure may be the filler part of a receptacle, such as an automobile radiator or an automobile fuel tank, the hub part of an automobile wheel, or any other tubular part having an end to be closed by a removable closure. In the present embodiment of the invention, the tubular neck 1 is of sheet metal and has its end to be closed flared outwardly, as at 2, and then extended radially inward to provide an annular flange 3.

Figure 6:
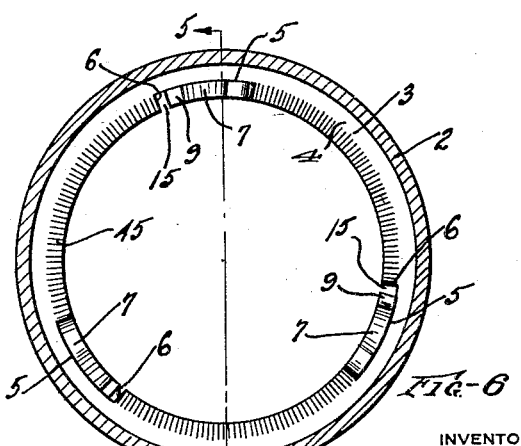

At two or more opposed points, three in the present instance, said flange is slotted circumferentially, as at 5, and radially inward, as at 6, one radial slot 6 being provided at one end of each of the three circumferential slots 5, said radial slots extending inwardly to the inner edge of the flange 3, as best indicated in Fig. 6.

There is thus formed at the inner circumference of flange 3, three circumferentially disposed tongues 7, each of which has a free end portion 9 extending inwardly with respect to the neck, that is, to the right, as viewed in Figs. 1 and 5. Each tongue adjacent its secured end is provided on its inner side 10, the side to the right, Figs. 1 and 5, with a hump 12 to produce between it and the inwardly extending free end portion 9 a "home" seat 14 for one of the locking portions of the closure, as will later appear. Entrance to these "home" seats for the closure locking portions is provided by the passageways 15, formed by bending inwardly the tongue free end portions 9, as best indicated in Figs. 5 and 6.

The closure of the structure, in the present embodiment of the invention, is also largely made of sheet metal and includes a body member, a plurality of locking members, three in the present instance, a supporting member for said locking members, and three sets of rivets and pins for mounting said locking members upon said supporting member.

The closure body member is in one-piece and includes a circular, dome-shaped cover portion 20 and an annular rim portion 21 extending radially inward.

The supporting member for the three locking members is also in one-piece and includes a tubular portion 23 provided at its end to the left, Figs. 1 and 4, with an annular, outwardly extending flange 25 clamped between the cover and rim portions of the closure body member, whereby said supporting member and said body member are firmly secured in assembled relation. At its end to the right, Figs. 1 and 4, the tubular portion 23 of the supporting member is provided with an annular, inwardly extending flange 27 which is provided at its inner edge with three opposed ears 28 extending outwardly with respect to the neck, that is, to the left, Figs. 1 and 4, in substantially parallel relation with but, of course, spaced from said tubular portion 23.

The three closure locking members are of identical construction and a description of one will therefore suffice for all. Each is a one-piece sheet metal member having a curved body portion 30 from the same side of which extend two end locking portions 31, preferably transversely curved, as indicated. The body portions of these locking members are arranged within the supporting member therefor, between the tubular portion 23 and the ears 28 thereof, while the end locking portions 31 of the locking members extend radially outward through openings 33 in said tubular portion. Extending between said tubular portion 23 and each of the three ears 28 is a rivet 35 having its ends journalled or rotatably mounted in suitable apertures therein, and through a transverse slot 37 in the shank of each of said rivets extends the body portion 30 of one of said locking members, said body portion being maintained in said slot by a pin 39 extending through said rivet and said locking member body portion, all as clearly shown in Fig. 4.

The closure is applied to the neck by passing the end locking portions 31 of the three locking members in turn through the passageways 15 of the neck flange 3 to positions on the inside of said flange, the locking members turning on their pivots 35 during such application. The closure is then turned in a clockwise direction which causes the locking portions 31 thereof to move along the inner surface 4 of the flange 3 to the inner surfaces 10 of the locking tongues 7, such movement of the closure being continued until one of the locking portions 31 of each closure locking member reaches a "home" seat 14 in one of the three neck locking tongues, at which time the closure is firmly but releasably connected to the neck, this being the position of the parts shown in Fig. 1.

To remove the closure from the neck, it is only necessary to turn the closure in the reverse direction, as will be readily understood.

If desired, and as shown, an annular gasket 42, of cork or other yieldable material, may be arranged between the closure and the neck for sealing purposes. In the present embodiment of the invention, the gasket 42 is assembled with the closure, being arranged between the rim portion 21 of the closure body member and the closure locking portions 31. When the closure is connected to the neck, as shown in Figs. 1 and 4, the gasket is compressed between the closure rim portion 21 and the neck flange 3, thereby effectively sealing the neck opening.

Preferably, and as shown, the inner surface 4 of the neck flange 3 and the inner surfaces 10 of the neck tongues 7 are provided with transverse locking serrations 45 which cooperate with the closure locking portions 31 in preventing accidental disconnection of the closure from the neck.

What I claim is:

1. A neck and closure structure, comprising a tubular neck and a removable closure for one end thereof, said neck being provided at its end to be closed with a plurality of locking portions, said closure being provided with a plurality of independent locking members and a support therefor, each of said locking members having an elongated body portion and a locking portion at each of the two ends thereof, said support being provided with a tubular portion having a plurality of pairs of openings, the body portions of said locking members being arranged circumferentially around the inner surface of said tubular portion and the locking portions of said locking members projecting outwardly through the openings in said tubular portion, said projecting locking end portions being adapted for removable locking engagement with the locking portions of the neck when the closure is applied to the neck.

2. A neck and closure structure, comprising a tubular neck and a removable closure for one end thereof, said neck being provided at its end to be closed with a plurality of locking portions, said closure being provided with a plurality of independent locking members and a support therefor, each of said locking members having an elongated body portion and a locking portion at each of the two ends thereof, said support being provided with a tubular portion having a plurality of pairs of openings and a plurality of spaced radially extending pivot members, the body portions of said locking members being pivotally supported on said pivot members within said tubular portion and the locking portions of said locking members projecting outwardly through and being movable in the openings in said tubular portion, said projecting locking end portions being adapted for removable locking engagement with the locking portions of the neck when the closure is applied to the neck.

3. A neck and closure structure, comprising a tubular neck and a removable closure for one end thereof, said neck being provided at its end to be closed with a plurality of locking portions, said closure being provided with a plurality of one-piece locking members and a support therefor, each of said locking members having an elongated curved body portion and a locking portion at each of the two ends thereof and extending laterally from the same side thereof, said support being provided with a tubular portion having a plurality of pairs of openings, the curved body portions of said locking members being circumferentially arranged within said tubular portion and the locking portions of said locking members projecting outwardly through the openings in said tubular portion, said projecting locking end portions being adapted for removable locking engagement with the locking portions of the neck when the closure is applied to the neck.

4. A neck and closure structure, comprising a tubular neck and a removable closure for one end thereof, said neck being provided at its end to be closed with a plurality of locking portions, said closure being provided with a body member, a plurality of independent locking members and a supporting member for said locking members, each of said locking members having an elongated body portion and a locking portion at each of the two ends thereof, said supporting member having a tubular portion provided with a plurality of pairs of openings, the body portions of said locking members being supported within said tubular portion and the locking portions of said locking members projecting outwardly through the openings in said tubular portion, said projecting locking end portions being adapted for removable locking engagement with the locking portions of the neck when the closure is applied to the neck, said supporting member also having at one end of said tubular portion means for connection to said body member and having at the other end of said tubular portion circumferentially arranged supporting means for the body portions of said locking members.

5. A neck and closure structure, comprising a tubular neck and a removable closure for one end thereof, said neck being provided at its end to be closed with a plurality of locking portions, said closure being provided with a body member, a plurality of locking members and a supporting member for said locking member, each of said locking members having an elongated body portion and a locking portion at each of the two ends thereof, said supporting member having a tubular portion provided with a plurality of pairs of openings, the body portions of said locking members being supported within said tubular portion and the locking portions of said locking members projecting outwardly through the openings in said tubular portion, said projecting locking end portions being adapted for removable locking engagement with the locking portions of the neck when the closure is applied to the neck, said supporting member also having at one end of said tubular portion means for connection to said body member and having at the other end of said tubular portion supporting ears for the body portions of said locking members, one ear for each such body portion.

6. A neck and closure structure, comprising a tubular neck and a removable closure for one end thereof, said neck being provided at its end to be closed with a plurality of locking portions, said closure being provided with a body member, a plurality of locking members and a supporting member for said locking members, each of said locking members having an elongated body portion and a locking portion at each of the two ends thereof, said supporting member having a tubular portion provided with a plurality of pairs of openings, the body portions of said locking members being supported within said tubular portion and the locking portions of said locking members projecting outwardly through the openings in said tubular portion, said projecting locking end portions being adapted for removable locking engagement with the locking portions of the neck when the closure is applied to the neck, said supporting member also having at one end of said tubular portion means for connection to said body member and having at the other end of said tubular portion supporting ears, and radially extending members carried by said ears and upon which the body portions of said locking members are mounted.

7. A neck and closure structure, comprising a tubular neck and a removable closure for one end thereof, said neck being provided at its end to be closed with a plurality of locking portions, said closure being provided with a body member, a plurality of locking members and a supporting member for said locking members, each of said locking members having an elongated body portion and a locking portion at each of the two ends thereof, said supporting member having a tubular portion provided with a plurality of pairs of openings, the body portions of said locking members being supported within said tubular portion and the locking portions of said locking members projecting outwardly through the openings in said tubular portion, said projecting locking end portions being adapted for removable locking engagement with the locking portions of the neck when the closure is applied to the neck, said supporting member also having at one end of said tubular portion means for connection to said body member and having at the other end of said tubular portion an inwardly extending flange provided at its inner end with supporting ears, and members extending between and carried by said ears and the tubular portion of said supporting member and upon which are mounted the body portions of said locking members.

8. A neck and closure structure, comprising a tubular neck and a removable closure for one end thereof, said neck being provided at its end to be closed with a plurality of locking portions, said closure being provided with a body member, a plurality of locking members and a supporting member for said locking members, each of said locking members having an elongated body portion and a locking portion at each of the two ends thereof, said supporting member having a tubular portion provided with a plurality of pairs of openings, the body portions of said locking members being supported within said tubular portion and the locking portions of said locking members projecting outwardly through the openings in said tubular portion, said projecting locking end portions being adapted for removable locking engagement with the locking portions of the neck when the closure is applied to the neck, said supporting member also having at one end of said tubular portion means for connection to said body member and having at the other end of said tubular portion an inwardly extending flange provided at its inner end with supporting ears, and members journaled in said ears and the tubular portion of said supporting member and upon which are mounted the body portions of said locking members.

9. A neck and closure structure, comprising a tubular neck and a removable closure for one end thereof, said neck being provided at its end to be closed with a transverse annular flange having opposed parts thereof formed as locking portions with passageways adjacent thereto for providing access to the inner surfaces thereof, the inner surface of said flange and the inner surfaces of the locking parts thereof being provided with transverse locking serrations, said closure being provided with opposed locking portions adapted to be passed through said neck passageways and cooperate with said neck flange locking parts in effecting a detachable connection of said closure to said neck, said neck serrations cooperating with said closure locking portions in preventing accidental disconnection of said closure from the neck.

In testimony whereof I hereby affix my signature.

JAMES S. REID.